United States Patent
Nijim et al.

(10) Patent No.: US 10,405,034 B1
(45) Date of Patent: Sep. 3, 2019

(54) BIOMETRIC ACCESS TO PERSONALIZED SERVICES

(71) Applicant: Cox Communications, Inc., Atlanta, GA (US)

(72) Inventors: Yousef Wasef Nijim, Cumming, GA (US); Jay Paul Langa, Cumming, GA (US); Anant Patil, Marietta, GA (US); Catherine Elizabeth Thompson, Roswell, GA (US)

(73) Assignee: COX COMMUNICATIONS, INC., Atlanta, GA (US)

( * ) Notice: Subject to any disclaimer, the term of this patent is extended or adjusted under 35 U.S.C. 154(b) by 33 days.

(21) Appl. No.: 15/350,468

(22) Filed: Nov. 14, 2016

(51) Int. Cl.
  *H04N 5/445* (2011.01)
  *H04N 21/4415* (2011.01)
  *H04N 21/258* (2011.01)
  *H04N 21/45* (2011.01)

(52) U.S. Cl.
  CPC ... *H04N 21/4415* (2013.01); *H04N 21/25883* (2013.01); *H04N 21/4532* (2013.01)

(58) Field of Classification Search
  CPC ......... H04N 21/25883; H04N 21/4415; H04N 21/4532
  USPC .......................................................... 725/35
  See application file for complete search history.

(56) References Cited

U.S. PATENT DOCUMENTS

| | | | | |
|---|---|---|---|---|
| 6,028,950 A | * | 2/2000 | Merjanian | G06F 21/32 382/115 |
| 2002/0048369 A1 | * | 4/2002 | Ginter | G06F 21/10 380/277 |
| 2005/0249386 A1 | * | 11/2005 | Juh | G06F 3/03543 382/124 |
| 2006/0107281 A1 | * | 5/2006 | Dunton | H03J 1/0025 725/11 |
| 2007/0156726 A1 | * | 7/2007 | Levy | G06F 17/3002 |
| 2008/0320520 A1 | * | 12/2008 | Beadle | H04H 60/40 725/46 |
| 2009/0076966 A1 | * | 3/2009 | Bishop | G06Q 20/027 705/67 |
| 2009/0320118 A1 | * | 12/2009 | Muller | G06F 21/34 726/9 |
| 2010/0232659 A1 | * | 9/2010 | Rahmes | G06K 9/00087 382/125 |
| 2010/0309147 A1 | * | 12/2010 | Fleizach | G06F 3/04883 345/173 |
| 2012/0011437 A1 | * | 1/2012 | James | G06F 1/1643 715/702 |
| 2012/0167124 A1 | * | 6/2012 | Abdeljaoued | H04H 60/45 725/11 |
| 2012/0206236 A1 | * | 8/2012 | King | G06F 21/32 340/5.83 |

(Continued)

*Primary Examiner* — Jivka A Rabovianski
(74) *Attorney, Agent, or Firm* — Merchant & Gould

(57) ABSTRACT

Systems and methods enable the use of biometric information to access personalized services provided by a service provider, but are not so limited. A disclosed system operates to receive biometric information in the form of fingerprint detection data from a fingerprint detection sensor and use fingerprint mapping parameters to provide personalizations to an associated user. A disclosed method operates to use fingerprint detection data associated with a detection of a user fingerprint by a fingerprint detection sensor and provide personalizations based on the fingerprint detection data.

20 Claims, 10 Drawing Sheets

(56) References Cited

U.S. PATENT DOCUMENTS

| | | | |
|---|---|---|---|
| 2013/0173925 A1* | 7/2013 | Yen | G06F 21/32 |
| | | | 713/186 |
| 2013/0290502 A1* | 10/2013 | Bilobrov | G06F 21/10 |
| | | | 709/223 |
| 2013/0321319 A1* | 12/2013 | Kuramatsu | G06F 3/04883 |
| | | | 345/173 |
| 2014/0172297 A1* | 6/2014 | Lin | G01C 21/206 |
| | | | 701/533 |
| 2015/0100910 A1* | 4/2015 | Luo | G06F 3/04883 |
| | | | 715/771 |
| 2015/0131878 A1* | 5/2015 | Kim | G06K 9/00073 |
| | | | 382/125 |
| 2015/0161837 A1* | 6/2015 | Smith | G07C 9/00158 |
| | | | 340/5.53 |
| 2015/0205623 A1* | 7/2015 | DiVincent | G06F 21/32 |
| | | | 713/100 |
| 2015/0324570 A1* | 11/2015 | Lee | G06K 9/3208 |
| | | | 382/124 |
| 2015/0355827 A1* | 12/2015 | Van Der Westhuizen | |
| | | | G06F 3/0482 |
| | | | 715/788 |
| 2016/0014457 A1* | 1/2016 | Dua | H04L 29/06027 |
| | | | 725/25 |
| 2016/0021423 A1* | 1/2016 | Varga | H04N 21/4415 |
| | | | 725/11 |
| 2016/0048323 A1* | 2/2016 | Laubach | G06F 3/0416 |
| | | | 345/173 |
| 2016/0217310 A1* | 7/2016 | Shah | G06K 9/001 |
| 2016/0358154 A1* | 12/2016 | Choi | G06Q 20/3278 |
| 2016/0373800 A1* | 12/2016 | Lin | H04N 21/42222 |
| 2017/0048303 A1* | 2/2017 | Szilagyi | H04L 67/06 |
| 2017/0085562 A1* | 3/2017 | Schultz | H04L 63/0861 |

\* cited by examiner

| User A Fingerprint | Preference |
|---|---|
| Left thumb | A |
| Left index | B |
| Left middle | C |
| Left ring | D |
| Left pinky | E |
| Right thumb | F |
| Right index | G |
| Right middle | H |
| Right ring | I |
| Right pinky | J |

FIGURE 2

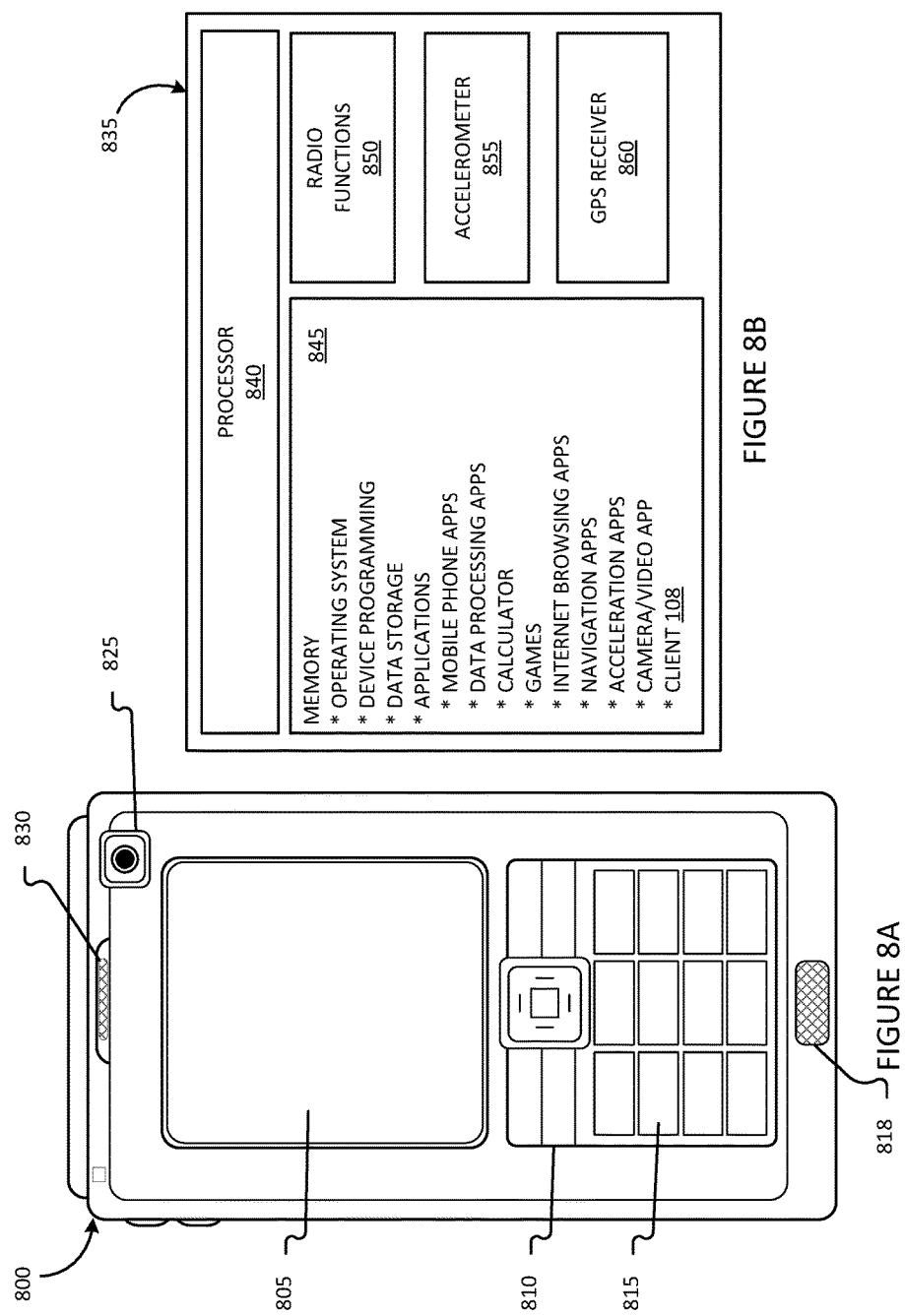

BIOMETRIC ACCESS TO PERSONALIZED SERVICES

BACKGROUND

Digital cable service providers provide services that include access to the Internet, video on demand, television programming, and other services via an associated network that typically includes fiber optic and/or coaxial cable infrastructure. A set-top box (STB) is usually connected to a television and used to decode transmission information to and from each customer. Some service providers allow customers to create a user profile where each customer is required to create and use login credentials (e.g., a username and password) in order to access services offered by a service provider. Some service provider networks are configured to allow other devices (e.g., smartphones, tablet computers, laptop computers, etc.) to access certain services based on login credentials. However, login credentials are not very secure and can be compromised by outside sources.

SUMMARY

Aspects of the present disclosure provide systems, methods, devices, and/or other subject matter that enable use of biometric information to access personalized services provided by a service provider, but are not so limited. A system of an embodiment operates to receive biometric information in the form of fingerprint detection data from a fingerprint detection sensor and use fingerprint mapping parameters to provide personalizations to an associated user. A method of an embodiment operates to use fingerprint detection data associated with a detection of a user fingerprint by a fingerprint detection sensor and provide personalizations based on the fingerprint detection data.

The details of one or more aspects are set forth in the accompanying drawings and description below. Other features and advantages will be apparent from a reading of the following detailed description and a review of the associated drawings. It is to be understood that the following detailed description is explanatory only and is not restrictive of the present disclosure.

BRIEF DESCRIPTION OF THE DRAWINGS

Further features, aspects, and advantages of the present disclosure will become better understood by reference to the following figures, wherein elements are not to scale so as to more clearly show the details and wherein like reference numbers indicate like elements throughout the several views:

FIG. 2 depicts an exemplary fingerprint mapping database in accordance with an embodiment;

FIGS. 8A-8B illustrate a suitable mobile computing environment with which embodiments may be practiced.

DETAILED DESCRIPTION

Figure 1:
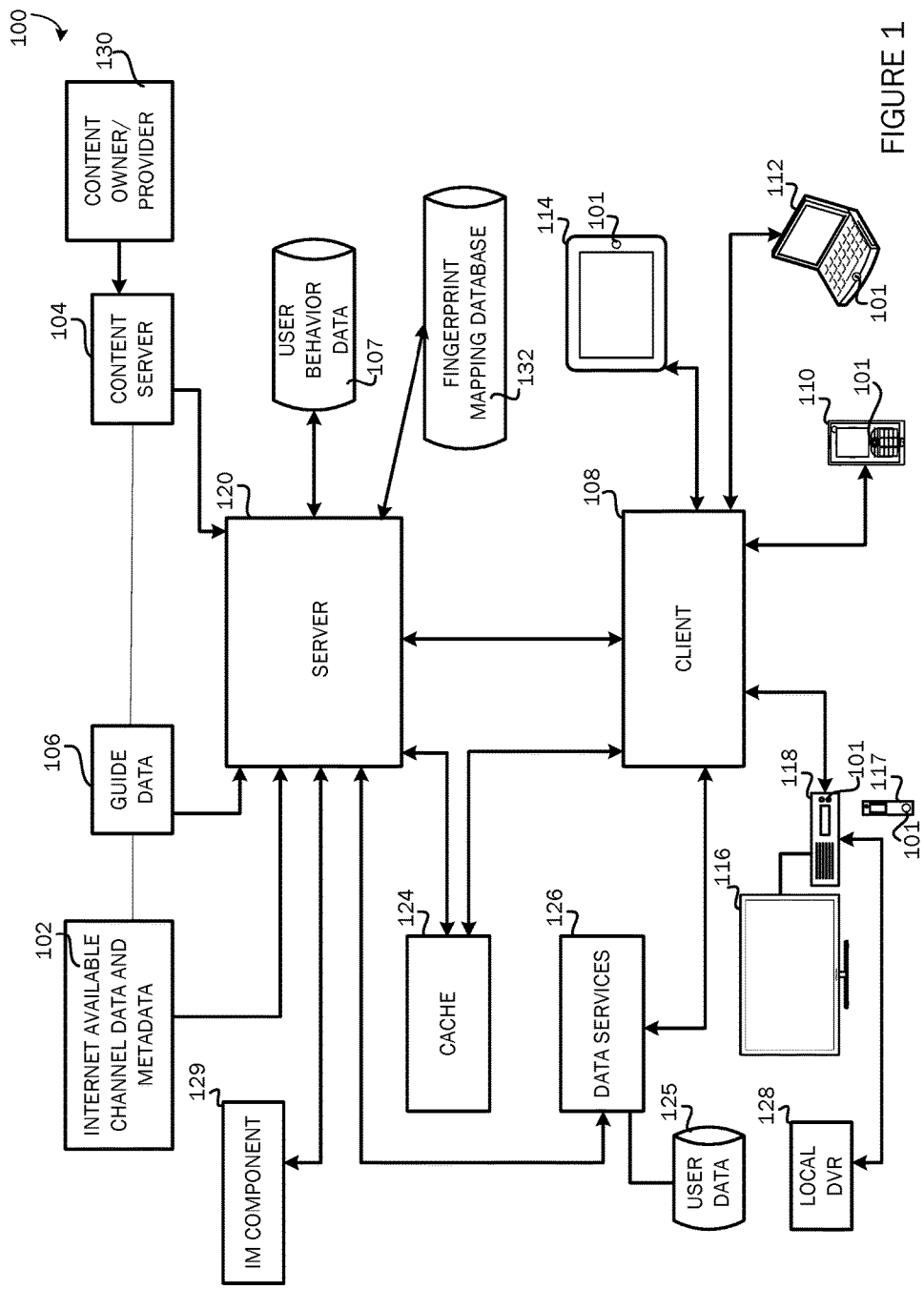
FIG. 1 is a block diagram of a system that enables users to access services and/or other information provided by a service provider network in accordance with an embodiment.

FIG. 1 is a block diagram of a system 100 that enables users to access services and/or other information, including personalized services and/or personalized information, provided by a service provider network such as an Internet and/or television programming provider for example, but is not so limited. The system 100 of an embodiment incorporates the use of detected biometric information associated with a user as part of enabling access to the service provider services and/or personalization of services and/or other information. Biometric information detection refers to an ability to uniquely identify an individual by evaluating one or more biological identifiers that include fingerprints, facial geometry, retina and iris patterns, voice patterns, and the like. As described below, the system 100 of one embodiment relies on use of detected fingerprint data, in the form of raw biometric data and/or digitized fingerprint minutiae for example, as part of enabling access to the service provider services and/or personalization of services for an end-user.

As shown in FIG. 1, system 100 includes a set-top box (STB) 118 coupled to television 116 and/or local digital video recorder (DVR) 128. Remote control 117 can be used to control aspects of STB, DVR 128, and/or television 116. System 100 also includes mobile communication device 110 (e.g., smartphone), wired and wireless computing devices (e.g., laptop computer 112, and tablet computer 114). According to an embodiment, a fingerprint detection sensor 101 can be incorporated into one or more of the remote control 117, STB 118, television 116, smartphone 110, laptop computer 112, and/or tablet computer 114. Alternatively, a fingerprint detection sensor 101 can be coupled to a device via a USB or other coupling. For example, fingerprint detection sensor 101 can be integrated into a home button of the tablet computer 114 or smartphone 110 as shown in FIG. 1. As another example, fingerprint detection sensor 101 can be integrated with a power button or other dedicated button or part of remote control 117 to detect one or more fingerprints as part of providing personalized services and/or information via STB 118 to users of a service provider or other system. Fingerprint detection sensor 101 may comprise an optical detection sensor, a capacitive detection sensor, or an ultrasound detection sensor, wherein each type of fingerprint detection sensor 101 includes associated detection hardware, firmware, and/or software. In certain embodiments, one or more sensor types can be manufactured using system on a chip (SoC) technology. Accordingly, a user has multiple secure options available to access service provider services, such as when surfing the Internet, watching video on demand or live programming, accessing digital video recordings, etc.

As can be appreciated, output from fingerprint detection sensor 101 can be stored in raw form and/or digitized into a digital form, such as a unique digital key for example. The output from fingerprint detection sensor 101 can be stored locally and/or remotely. It may be preferable to store raw biometric data in secure local computer readable storage to reduce a likelihood of compromising the raw data. Digitized fingerprint detection data is sometimes referred to as fingerprint minutiae, which may be used to reduce an amount of memory to store the digitized fingerprint data as compared to the raw data. Fingerprint minutiae can refer to certain features of a detected fingerprint which may include one or more of a ridge ending, a ridge bifurcation, a short ridge, an island, a ridge enclosure, a spur, a crossover, a delta, and/or a core.

With continuing reference to FIG. 1 and also described further below with respect to FIG. 2, the system 100 of one embodiment includes a fingerprint mapping database 132 that stores fingerprint mapping parameters associated with registered fingers of users of a service provider network, but is not so limited. Fingerprint mapping database 132 of one embodiment stores several fingerprints under a primary fingerprint (e.g., a fingerprint command hierarchy) and/or an account number. As described further below, a fingerprint registration process (see FIG. 3 for example) enables a user to create fingerprint mapping parameters that define one or more personalized commands, settings, actions, etc., associated with one or more registered fingerprints. Due in part to the security afforded through the fingerprint registration process, a service provider can allow registered users to purchase content or additional services outside the household. The system 100 can track, via fingerprint detection and/or device identification, who accessed and/or purchased content outside the household. Using a registered fingerprint to access and receive personalized services and/or information provides an additional level of security as compared to use of conventional login processes that rely on username and password authentication credentials. Since fingerprints are unique and virtually impossible to replicate, the system 100 restricts unauthorized access to services and unauthorized reconfiguration of account details, further enhancing security measures beyond conventional authentication technologies.

As described further below, client 108 is configured to interact with server 120 as part of performing a fingerprint mapping registration process that enables a user to define fingerprint mapping parameters between fingerprints and/or personalized commands, personalized preferences, personalized actions, and/or other personalizations associated with a registered fingerprint. Fingerprint mapping database 132 can be used to store the various fingerprint mapping parameters on a per user or group basis, but is not so limited. The fingerprint detection sensor 101 can be used during the fingerprint registration process to register each fingerprint and the client 108 can be used to define fingerprint mapping parameters for each registered fingerprint. The client 108 and/or server 120 can also use output of the fingerprint detection sensor 101 to determine a user identity based on a detection of a registered fingerprint as part of querying the mapping database 132 for corresponding fingerprint mapping parameters. According to one embodiment, user profile data, past viewing history data, channel preferences, favorite preferences, preferred settings, etc., can be pulled/pushed based on the user identity stored in an identity management component 129 or other system/device associated with a registered fingerprint, such as, for example, a user behavior database 107. A master fingerprint can also be registered so that, once detected, it enables an associated user to control and/or adjust settings and/or preferences associated with other users defined under the master fingerprint. Once all fingerprint mappings are defined for each user, detection of a registered fingerprint can cause client 108 to issue communication signals that convey raw biometric data and/or digitized detection data to a back office or other component as part of providing personalized services and/or other information to an end user, but is not so limited.

As described above, in contrast to conventional use of a username and password for authentication, use of a biometric identifier, such as a registered fingerprint, provides a formidable layer of security for the system 100 and user. A registered fingerprint safeguards against an unauthorized user logging in and using personalized services of an authorized user. According to an embodiment, any registered fingerprint, once detected, allows an associated user to obtain services and/or personalized content and/or settings from a service provider or other entity. For example, fingerprint detection sensor 101 can be used to read a fingerprint, which can then be matched against one or more of a set of fingerprints associated with a service provider account as stored in an identity management system. Upon identifying a match, the system 100 allows the user to access the STB 118 to watch personalized television programming, receive recommended and/or related programming (including on-demand programs), enable parental controls, enable closed captioning, associate all or some personalized portion of video and non-video services, provide personalized channels, and/or any other related and personalized service for the particular user.

As part of a fingerprint registration process, the system 100 of one embodiment allows users to define fingerprint mapping parameters according to registered fingerprint orientations and/or sequences. Registering multiple fingerprints, fingerprint orientations, and/or fingerprint input sequences, allows for defining fingerprint mapping parameters for each registered fingerprint to create a broad hierarchy of potential commands. For example, an upward fingerprint orientation may define a first set of fingerprint mapping parameters, whereas a downward fingerprint orientation may define a second set of fingerprint mapping parameters. A sequence of fingerprint inputs (e.g., thumb followed by index, etc.) may define a third set of fingerprint mapping parameters.

Upon detecting a registered fingerprint by a fingerprint detection sensor 101, the system 100 operates to access and/or provide personalized services and/or information from a service provider system or other entity to an associated user according to corresponding fingerprint mapping parameters, as described above. For example, a user may use a fingerprint detection sensor 101 of a smartphone to register a left thumbprint and define fingerprint mapping parameters such that, when the left thumbprint of the user is detected via the fingerprint detection sensor 101, the client 108 sends a signal requesting fingerprint mapping parameters from server 120 or fingerprint mapping database 132 or another component, wherein the fingerprint mapping parameters map to a personalized viewing guide that includes favorite channels of the user by genre or some other criteria, digital video recorder (DVR) recordings for the user, DVR settings for the user, video on demand settings for the user, closed captioning settings for the user, parental controls for the user, and/or other personalized settings or preferences. As another example, a user may register a left index finger to define a mapping that, when the left index finger is detected, results in client 108 requesting fingerprint mapping parameters from server 120 or fingerprint mapping database 132 or another component that map to personalized profile settings associated with one or more users of a viewing household. As yet another example, a user may define a mapping between a pointing down left thumbprint that, when detected, results in client 108 requesting fingerprint mapping parameters from server 120 or fingerprint mapping database 132 or another component that map most recent DVR recordings and favorite channels for the user. It will be appreciated that a large variety of fingerprint mapping parameters may be defined for each user to provide a customized and secure interaction paradigm. In one embodiment, television 116 or another display device can be used to display an overview of fingerprint mapping parameters for each registered fingerprint on a per user basis. The overview can also be used to edit fingerprint mapping parameters without having to rescan or re-register an associated fingerprint.

Components of the system 100 may operate as a distributed system where each component is accessed via a suitable network, or the components may operate together as an integrated system. As illustrated, Internet-available channel data and metadata 102, content server 104, guide data 106, and/or fingerprint mapping parameters may be provided and used to convey personalized programming, personalized content, personalized guide views, personalized settings, and/or other personalized preferences and/or other information to users of the system 100. For example, Internet-available channel data and metadata 102 may include personalized video content data and metadata available on the Internet, such as YOUTUBE®, HULU®, etc. Content server 104 may include video content data and metadata available via a service provider, such as cable television (CATV) services and/or Internet system (as illustrated and described below with reference to FIG. 6), satellite television/Internet provider, or other content owner/provider 130. The data and metadata may include information such as personalized data and/or settings, video content titles, storylines, casts, genres, ratings, release dates, images, etc.

A content source can include linear and/or non-linear content available to the consumers via a service provider or other content owner/provider 130 source, but is not so limited. For example, the broadcasts of television programs carried via the content server 104, which may be temporarily spooled on computer-readable storage media or directly transmitted over the physical network, from television networks are included as content sources. As will be appreciated, content that is described as "broadcast" will include content that is unicast (e.g., from a source to a caching location (e.g., cache 124), between caching locations, and from a caching location to a consumer) as linear content. Cache 124 can also be used to store user personalizations associated with one or more registered fingerprints to reduce an amount of time required to provide associated personalizations and/or information from server 120 or other remote component.

Computers and devices used in the provision of personalization of services and/or information include processors and memory storage devices, which store instructions that when executed by the processors enable the provision of services and/or information. Memory storage devices are articles of manufacture that include computer-readable storage media. The term computer-readable storage media does not include transmission media, but refers to hardware media used to store desired information for access by a computer or processor. Examples of computer-readable storage media include, but are not limited to, RAM, ROM, EPROM, EEPROM, solid state memory, such as flash memory, optical storage, such as CD-ROMs and DVDs, and magnetic storage devices, such as magnetic tape and magnetic disks.

With continuing reference to FIG. 1, guide data 106 may include channel information, programming information, network information, etc. As described above, fingerprint mapping database 132 includes fingerprint mapping parameters that define mappings between registered fingerprints and associated personalizations that include personalized commands, personalized actions, personalized settings, etc. DVR 128 stores content item recordings while recording from a TV 116 connected to STB 118, or recordings can be stored on an IP network when recording from IP enabled devices 110, 112, 114 respectively. Local DVR 128 can also be included as part of STB 118. User preferences and/or other personalized information may be cached in cache 124, a memory storage device, or some other component. The cache 124 is illustrated in FIG. 1 as a remote element, but may be integrated with the server 120, client 108, STB 118, DVR 128, etc. According to one embodiment, cached information may be specific to a user or user profile based on detected fingerprint data. As described above, according to an embodiment, raw biometric data and/or digitized data can be stored locally or remotely in secure storage to reduce likelihood of compromising the data.

The system 100 may include a data services system 126 which may comprise information such as billing data, permissions and authorization data, user profile data, digitized fingerprint data, etc., that can be stored in user database 125. The data services system 126 may be accessed by the server 120 for mapping and/or using fingerprint data, checking permissions, subscriptions, profile data, past viewing data for associating channel, programming, guide data, etc. for specific users.

As described above, various endpoint devices may be utilized to capture and transmit fingerprint data as part of accessing television programming and/or other personalized content. The endpoint devices use display technology to display personalized information according to the fingerprint mapping parameters stored in fingerprint mapping database 132. For example, embodiments can use any video decoding display device that uses one or more graphics processors to display personalized content. As shown in FIG. 1, exemplary endpoint devices can include, but are not limited to, a mobile communication device 110, such as a mobile phone, a computing device 112, such as a desktop computer, a laptop computer, etc., a wireless computing device, such as a tablet computer 114, a television 116, such as an Internet-connected television or a television connected to a network-connected device, such as a STB 118, DVR 128, etc. The client 108 can be integrated with one or more endpoint devices. FIG. 1 provides one implementation example and it will be appreciated that other implementations of system 100 can be defined.

FIG. 2 depicts an exemplary fingerprint mapping database 200 in accordance with an embodiment. As shown in FIG. 2, fingerprint mapping database 200 (e.g., fingerprint mapping database 132) includes registered fingerprints 202 and associated fingerprint mapping parameters 204 associated with each registered fingerprint 202. Commands, actions, etc., associated with fingerprint detection operations can be used as part of an initial login procedure and/or after logging in to system 100. As shown in the example of FIG. 2, fingerprint mapping database 200 maps to preference set A when fingerprint detection sensor 101 detects a registered left thumb of user A. Preference set A may, for example, include fingerprint mapping parameters 204 that, upon detecting a registered left thumb of user A, launch a home page for user A that includes favorite channels, DVR recordings, recently viewed on demand items, and/or other user profiles controlled by user A. As another example, preference set A may be limited to logging user A into system 100 and displaying a current channel via STB 118.

Continuing with the example of FIG. 2, preference set B is used when fingerprint detection sensor 101 detects a registered left index finger of user A; preference set C is used when fingerprint detection sensor 101 detects a registered left middle finger of user A; preference set D is used when fingerprint detection sensor 101 detects a registered left ring finger of user A; preference set E is used when fingerprint detection sensor 101 detects a registered left pinky finger of user A, and so on. It will be appreciated that fingerprint mapping database 200 can be used to track fingerprint mapping parameters 204 of a plurality of users of system 100 or a database instance may be associated with each user. Fingerprint orientations and/or sequences can also be used to provide additional mapping granularity. As an example, a thumb down fingerprint can be mapped as a dislike operation or as a logoff operation. In another embodiment, a fingerprint mapping database 200 is not required and personalizations can be automatically pushed to each user upon detecting a registered fingerprint 202, wherein the personalizations can be based on age, gender, past viewing history, etc. FIG. 2 provides one implementation example and it will be appreciated that other implementations of fingerprint mapping database 200 and associated fingerprint mapping parameters 204 can be defined.

Figure 3:
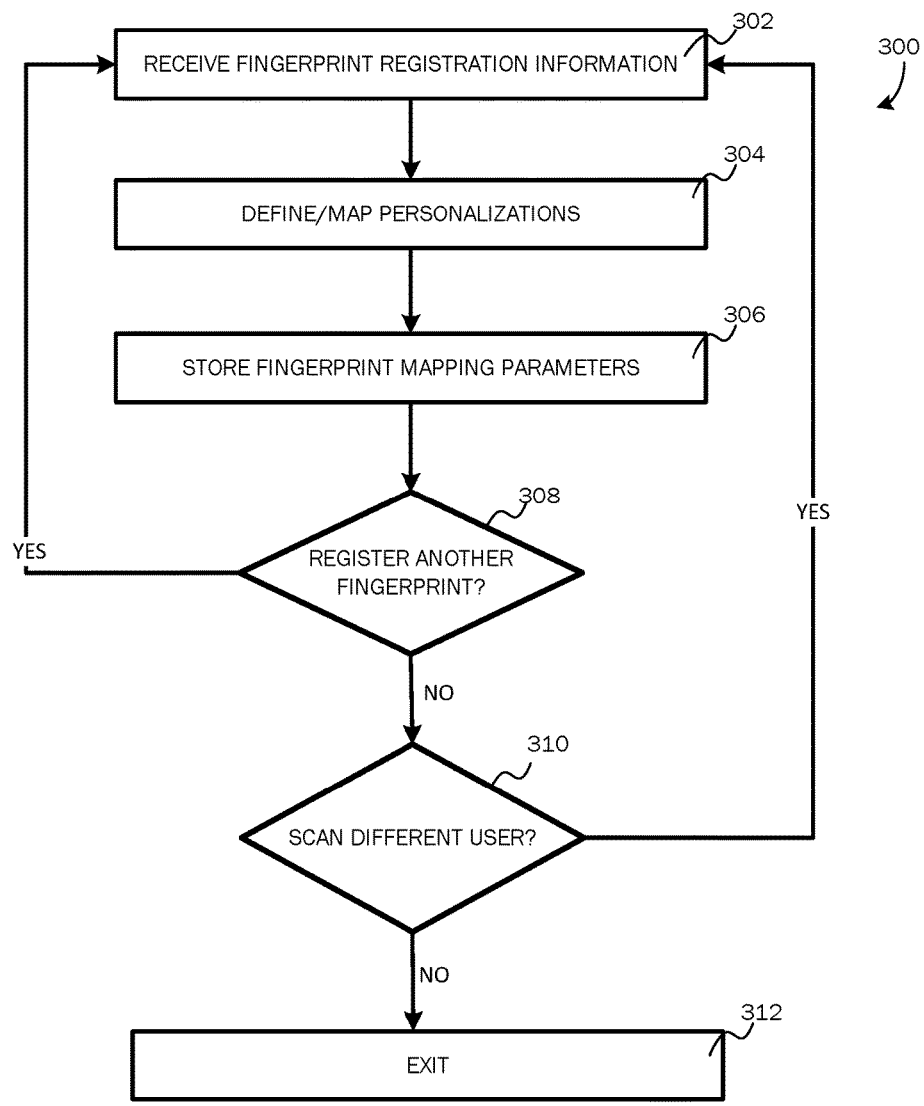
FIG. 3 is a flow diagram that depicts a process of registering one or more fingerprints of one or more users according to an embodiment.

FIG. 3 is a flow diagram that depicts a process 300 of registering one or more fingerprints of one or more users of a service provider system (e.g., system 100) as part of providing personalization based on one or more registered fingerprints 202, according to an embodiment. At 302, the process 300 receives information associated with registering a fingerprint of a user of a service provider system. For example, process 300 can receive a signal from a smartphone or tablet computer (e.g., via client 108) after a user scans a fingerprint with an integrated or coupled fingerprint scanner or reader (e.g., fingerprint detection sensor 101). In one embodiment, the process 300 at 302 requires that a user download or access a service provider registration application, such as a web page, television application, and the like, that coordinates process 300 based on a user identity. As an example, an identity management system (e.g., IM 129) can store user identity information including registered fingerprint data associated with each user account as part of the fingerprint registration process. In one embodiment, upon receiving power, a STB 118 and/or television 116 operates to display a menu feature, guide feature, and/or other interactive display component that alerts the user to an incomplete fingerprint registration procedure or, if already registered, prompts the user to scan a finger using fingerprint detection sensor 101 of remote control 117 or a different wireless device.

At 304, after detecting a fingerprint using fingerprint detection sensor 101, the process 300 prompts the user to map personalizations to the fingerprint, such as television programming personalizations associated with a user account or profile. In an embodiment, the process at 304 is automated to automatically associate one or more personalizations with each registered fingerprint 202. As an example, a first set of predefined personalizations can be automatically mapped to a first registered fingerprint 202, such as favorite channels, closed captioning settings, parental controls, and the like. In another embodiment, the user can be prompted to create one or more personalizations from scratch and/or select/modify from one or more preset or predefined personalizations that map to the user fingerprint. A default personalization configuration for each fingerprint of one embodiment introduces a one touch mapping that automatically logs in one or more users when a master fingerprint is detected. A master fingerprint may be defined such that the master fingerprint acts as a one touch command to automatically login an associated user and/or one or more subordinate users. The process 300 at 304 of one embodiment operates to use fingerprint orientations to provide further granularity when defining fingerprint mapping parameters 204 and/or fingerprint controls for one or more users. For example, a first set of preferences may be mapped to a pointing up fingerprint, a second set of preferences may be mapped to a pointing down fingerprint, a third set of preferences may be mapped to a pointing right fingerprint, and a fourth set of preferences may be mapped to a pointing left fingerprint.

At 306, the process 300 operates to store the fingerprint mapping parameters 204 to computer readable storage. In one embodiment, the process 300 at 306 stores the biometric data and/or fingerprint mapping parameters 204 in a fingerprint mapping database 132. The fingerprint mapping parameters 204 can then be used to uniquely identify the user upon a subsequent detection operation (via IM 129 for example). As described above, fingerprint data, both biometric and/or digitized can be stored in secure storage using hardware and/or software tools. For example, a field programmable gate array (FGPA) and associated logic can be used to securely store fingerprint data using digital minutiae keys to control access and/or use of the fingerprint data. If the user would like to scan another fingerprint and define different or modified personalization mappings for a different fingerprint at 308, the process 300 returns to 302. If the user does not want to register another fingerprint at 308 and if another user does not want to register a fingerprint at 310, the process 300 ends at 312. If the user does not want to register another fingerprint at 308 but a different user wants to register a fingerprint at 310, the process 300 again returns to 302 to allow the different user to register fingerprint mapping parameters 204.

Figure 4:
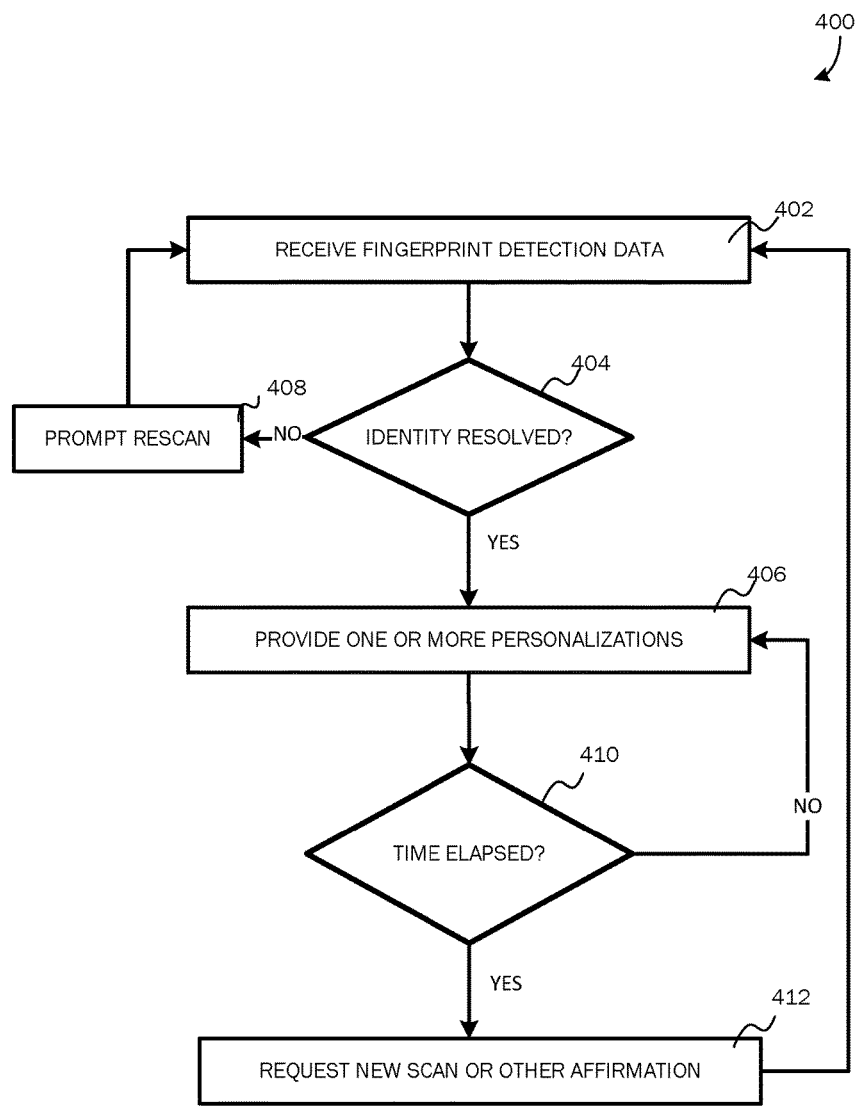
FIG. 4 is a flow diagram that depicts a process of providing one more personalizations associated with one or more registered fingerprints according to an embodiment.

FIG. 4 is a flow diagram that depicts a process 400 of providing one more personalizations associated with one or more registered fingerprints 202 according to an embodiment. At 402, the process 400 begins by receiving data associated with a detection of a fingerprint. The process 400 at 402 of an embodiment receives digitized fingerprint detection data from fingerprint detection circuitry (e.g., fingerprint detection sensor 101). For example, the process 400 at 402 uses server 120 to receive digitized fingerprint data from a STB 118 after detecting the fingerprint by the fingerprint detection sensor 101 of remote control 117.

At 404, if the process 400 is able to determine an identity of the user associated with the fingerprint detection data, the process 400 at 406 provides one or more personalizations based in part on one or more fingerprint mapping parameters 204 associated with the fingerprint detection data. For example, the process 400 at 404 can query an identity management system (e.g., IM 129) requesting identity and/or profile information for the user associated with the fingerprint detection data to identify corresponding personalization mappings stored in database 132. As described above, content information, service provider information, user information, etc., can be used to provide personalizations associated with the mappings.

At 404, if the process 400 is unable to determine an identity of the user associated with the fingerprint detection data, the process 400 at 408 prompts the user to rescan the fingerprint, before returning to 402. At 410, if a defined amount of time has elapsed since providing the personalizations at 406, the process 400 at 412 of an embodiment operates to request a new fingerprint scan or other affirmation (e.g., button press) before reconfiguring the personalizations to a default or generic setup, before returning to 402. The process 400 of one embodiment automatically reconfigures the personalizations to a default setup when a user turns off the television 116, STB 118, or other connected device or to a different user's personalizations upon receiving different fingerprint data associated with a different registered fingerprint. The use of a timed interactive session by process 400 tends to ensure that a verified user is using services of an associated service provider. The user may be required to once again scan a fingerprint at 402 in order to resume receiving corresponding personalizations. If a defined amount of time has not elapsed, the process 400 continues to provide the personalizations at 406.

Figure 5A:
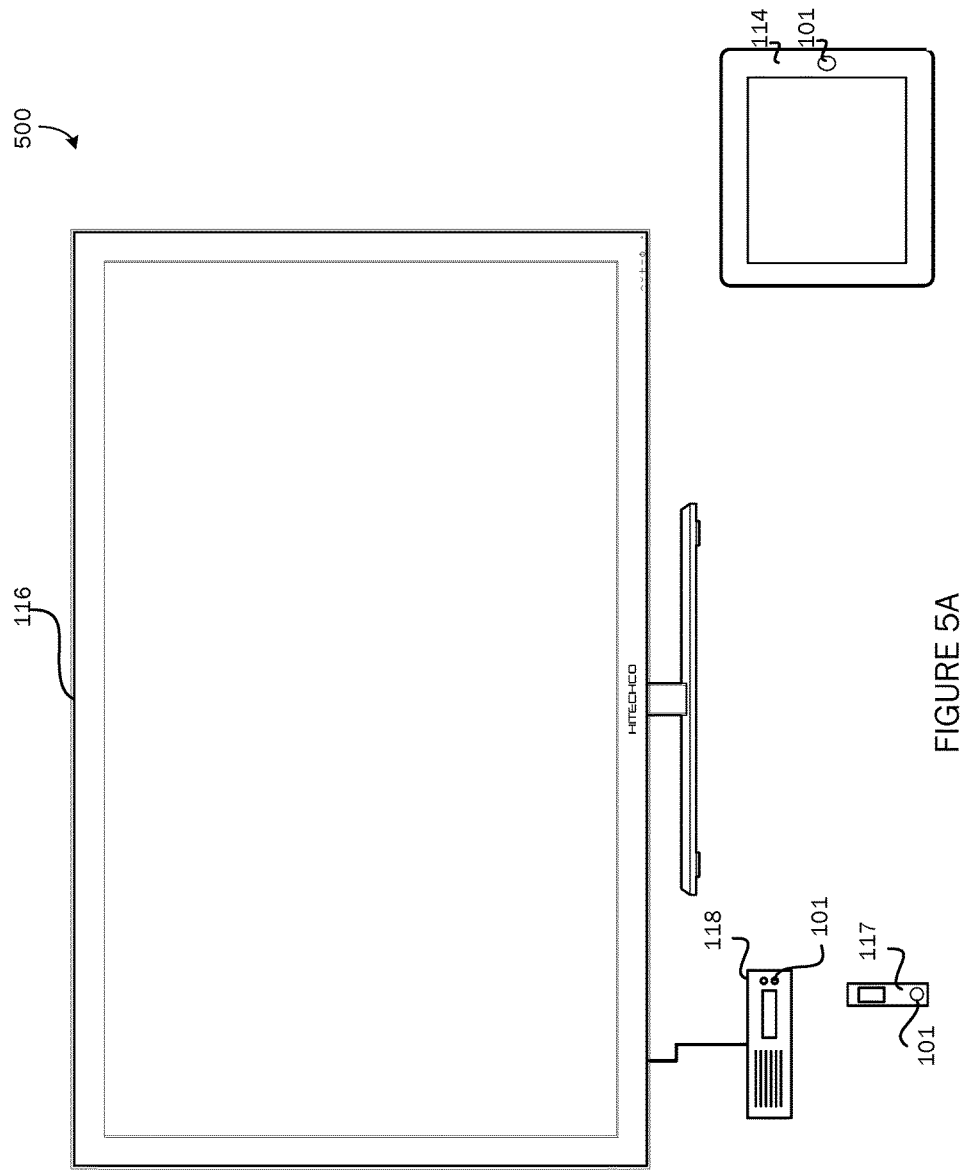
FIGS. 5A-5C depict aspects of an exemplary interactive system that utilizes fingerprints to control access and/or personalization of services and/or information in accordance with an embodiment.
Figure 5B:
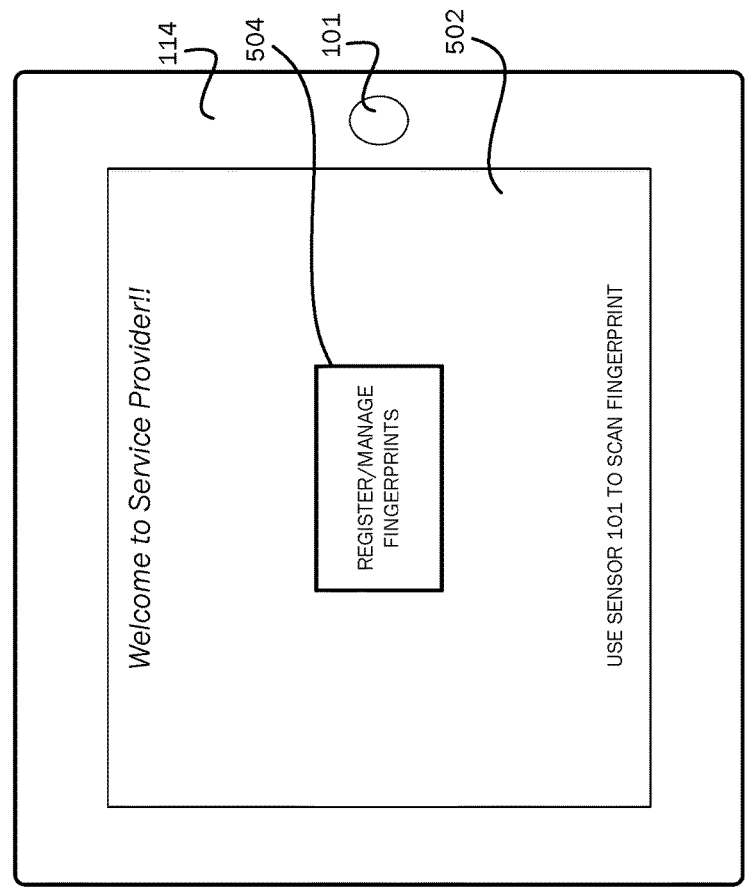
Figure 5C:
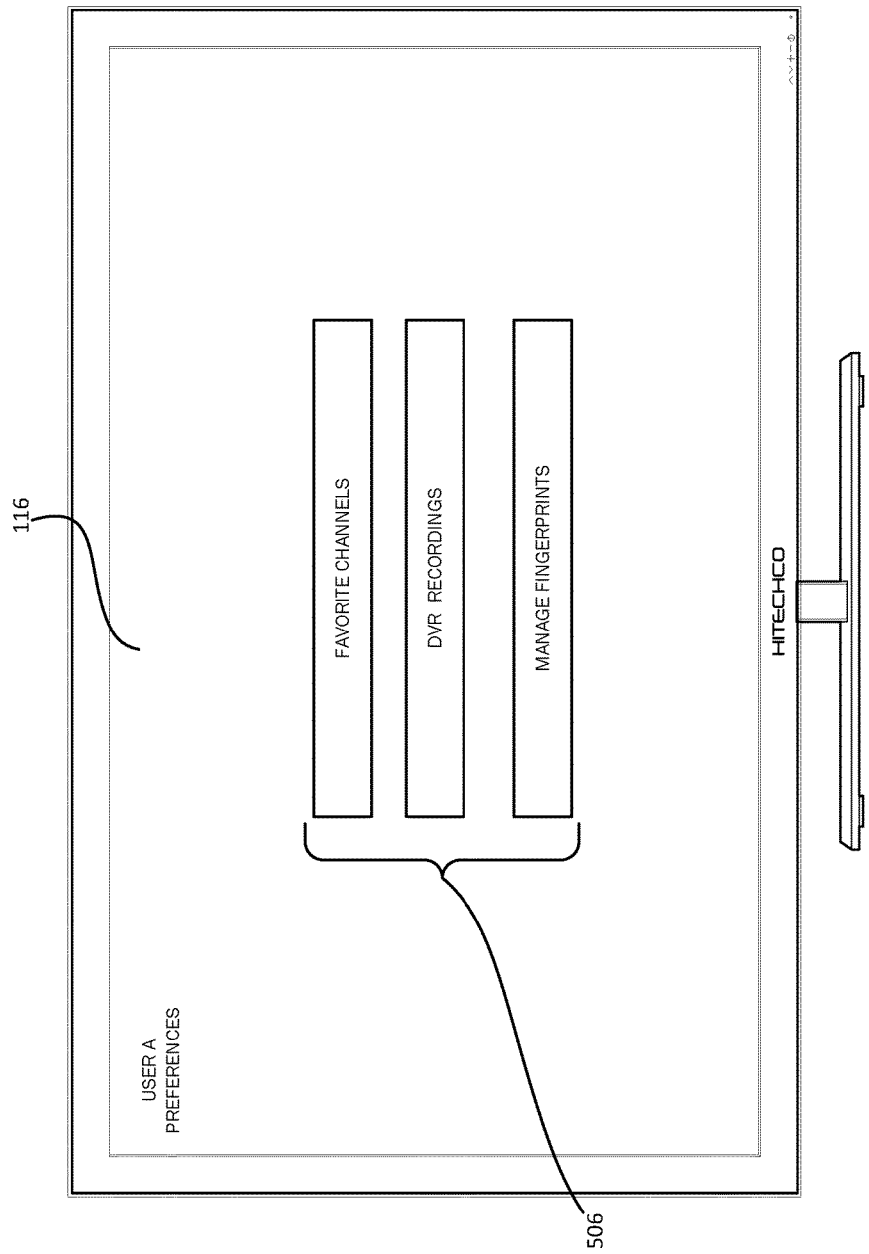

FIGS. 5A-5C depict aspects of an exemplary interactive system 500 at a high level that utilizes fingerprints to control access and/or personalization of services and/or information provided in part by a service provider, such as a digital cable television services, telecommunication services, home automation services, etc. As shown in FIG. 5A, system 500 includes, but is not limited to, a high definition television 116, a STB 118, a remote control 117 that includes a fingerprint detection sensor 101, and a tablet 114 that includes a fingerprint detection sensor 101. Assume for the purposes of FIG. 5A that television 116 is in an "off" power state.

While certain embodiments are described with respect to the use of fingerprint based access and/or personalization features, other embodiments include the use other biometric indicators such as facial geometry and expressions, retina and iris patterns, skin temperature, perspiration, voice patterns, and the like. For example, a microphone can be used to detect voice pitch and/or volume parameters which can be used to identify a user and/or control access and/or personalization features as described herein. As one example, detection of a high pitched voice may result in a first type of personalization whereas detection of a a low pitched voice may result in a second type of personalization. As another example, iris and/or retinal scans can be used to control access and/or personalization features as described herein. As one example, detection of a right eye of a registered user may result in a first type of personalization whereas detection of a left eye of the user may result in a second type of personalization. As yet another example, a camera and a facial recognition algorithm can be used to identify different facial expressions in order to control access and/or personalization features as described herein. As one example, detection of a first type of facial expression (e.g., a smile) may result in a first type of personalization whereas detection of a second type of facial expression may result in a second type of personalization. Other types of biometric and/or physiological sensors (e.g., heart rate sensor (e.g., optical and/or acoustical sensor), perspiration sensor (e.g., galvanic skin response (GSR) sensor, pressure sensor, etc.)) can be used as part of providing the access and/or personalization features described herein.

FIG. 5B depicts tablet 114 at about the same time, where the user has opened a web page or dedicated service provider or television application that displays an interactive user interface (UI) 502. As one example implementation, UI 502 includes a fingerprint management element 504 that the user can activate to manage and/or register fingerprint data. Upon actuation of fingerprint management element 504, UI 502 of one embodiment operates to display a fingerprint mapping diagram or listing that provides details of registered fingerprint to personalization mappings for a registered user and/or each registered user associated with a service provider account. FIG. 5C shows television 116 in an "on" power state displaying preferences 506 associated with a user after detecting a registered fingerprint via fingerprint detection sensor 101 of remote 117 or tablet 114.

Figure 6:
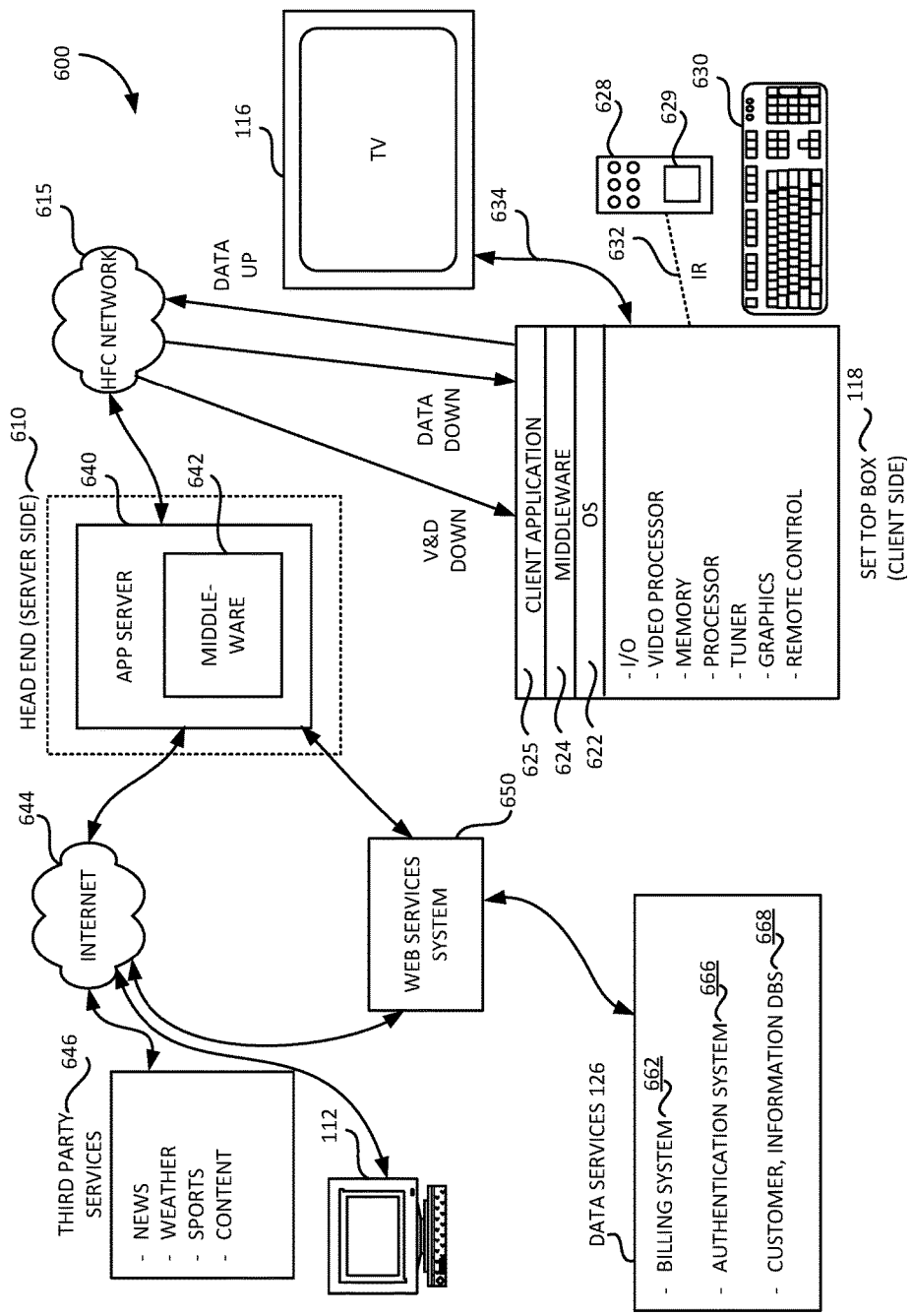
FIG. 6 is a block diagram illustrating a cable television services system architecture providing an operating environment according to an embodiment.

FIG. 6 is a block diagram illustrating a cable television services system 600 (hereafter referred to as "CATV") architecture providing an operating environment according to an embodiment. As should be appreciated, a CATV services system 600 is but one of various types of systems that may be utilized for providing an operating environment for providing functionality described herein. Referring now to FIG. 6, digital and analog video programming, information content and interactive television services are provided via a hybrid fiber coax (HFC) network 615 to a television 116 for consumption by a cable television/services system customer. As is known to those skilled in the art, HFC networks 615 combine both optical fiber and coaxial cable lines. Typically, optical fiber runs from the cable head end 610 to neighborhoods of subscribers. Coaxial cable runs from the optical fiber feeders to each customer or subscriber. The functionality of the HFC network 615 allows for efficient bidirectional data flow between the STB 118 and the application server 640 of the embodiment.

The CATV system 600 is in the form of a distributed client-server computing system for providing video and data flow across the HFC network 615 between server-side services providers (e.g., cable television/services providers) via a server-side head end 610 and a client-side customer via a STB 118 functionally connected to a customer receiving device, such as the television 116. As is understood by those skilled in the art, modern CATV systems 600 may provide a variety of services across the HFC network 615 including traditional digital and analog video programming, telephone services, high speed Internet access, video-on-demand, home security services, etc.

On the client side of the CATV system 600, digital and analog video programming and digital and analog data are provided to the television 116 via the STB 118. Interactive television services that allow a customer to input data to the CATV system 600 likewise are provided by the STB 118. As illustrated in FIG. 6, the STB 118 is a multipurpose computing device having a computer processor, memory, and an input/output mechanism. The input/output mechanism receives input from server-side processes via the HFC network 615 and from customers via input devices such as the remote control device 628 (e.g., remote control 117), keyboard 630, or other computing device 112, such as a tablet/slate computer 114, smart phone 110, etc. The remote control device 628 and the keyboard 630 may communicate with the STB 118 via a suitable communication transport such as the infrared connection 632. The remote control device 628 may include a biometric input module 629. The STB 118 also includes a video processor for processing and providing digital and analog video signaling to the television 116 via a cable communication transport 634. A multichannel tuner is provided for processing video and data to and from the STB 118 and the server-side head end system 610, described below.

The STB 118 also includes an operating system 622 for directing the functions of the STB 118 in conjunction with a variety of client applications 625. For example, if a client application 625 requires personalizations to be displayed on the television 116, the operating system 622 may cause the graphics functionality and video processor of the STB 118, for example, to output personalization data to the television 116 at the direction of the client application 625.

Because a variety of different operating systems 622 may be utilized by a variety of different brands and types of set-top boxes, a middleware layer 624 may be provided to allow a given software application to be executed by a variety of different operating systems. According to an embodiment, the middleware layer 624 may include a set of application programming interfaces (APIs) that are exposed to client applications and operating systems 622 that allow client applications to communicate with the operating systems through common data calls understood via the API set. As described below, a corresponding middleware layer is included on the server side of the CATV system 600 for facilitating communication between the server-side application server and the client-side STB 118. The middleware layer 642 of the server-side application server and the middleware layer 624 of the client-side STB 118 may format data passed between the client side and server side according to the Extensible Markup Language (XML).

According to one embodiment, the STB 118 passes digital and analog video and data signaling to the television 116 via a one-way communication transport 634. According to other embodiments, two-way communication transports may be utilized, for example, via high definition multimedia (HDMI) ports. The STB 118 may receive video and data from the server side of the CATV system 600 via the HFC network 615 through a video/data downlink and data via a data downlink. The STB 118 may transmit data from the client side of the CATV system 600 to the server side of the CATV system 600 via the HFC network 615 via one data uplink. The video/data downlink is an "in band" downlink that allows for digital and analog video and data signaling from the server side of the CATV system 600 through the HFC network 615 to the STB 118 for use by the STB 118 and for distribution to the television 116.

The data downlink and the data uplink, illustrated in FIG. 6, between the HFC network 615 and the STB 118 comprise "out of band" data links. As is understand by those skilled in the art, the "out of band" frequency range is generally at a lower frequency than "in band" signaling. Data flow between the STB 118 and the server-side application server 640 is typically passed through the "out of band" data links. Alternatively, an "in band" data carousel may be positioned in an "in band" channel into which a data feed may be processed from the application server 640 through the HFC network 615 to the STB 118. Operation of data transport between components of the CATV system 600, described with reference to FIG. 6, is well known to those skilled in the art.

Referring still to FIG. 6, the head end 610 of the CATV system 600 is positioned on the server side of the CATV system and includes hardware and software systems responsible for originating and managing content for distributing through the HFC network 615 to client-side STBs for presentation to customers. As described above, a number of personalized services may be provided by the CATV system 600, including digital and analog video programming, interactive television services, telephone services, video-on-demand services, targeted advertising, etc.

The application server 640 can be configured as a computing system operative to assemble and manage data sent to and received from the STB 118 via the HFC network 615. As described above, the application server 640 includes a middleware layer 642 for processing and preparing data from the head end of the CATV system 600 for receipt and use by the client-side STB 118. For example, content metadata of a third-party content provider service may be downloaded by the application server 640 via the Internet 644. When the application server 640 receives the downloaded content metadata, the middleware layer 642 may be utilized to format the content metadata for receipt and use by the STB 118.

According to one embodiment, data obtained and managed by the middleware layer 642 of the application server 640 is formatted according to the Extensible Markup Language and is passed to the STB 118 through the HFC network 615 where the XML-formatted data may be utilized by a client application 625 in concert with the middleware layer 624, as described above. As should be appreciated by those skilled in the art, a variety of third-party services data 646, including news data, weather data, sports data and other information content may be obtained by the application server 640 via distributed computing environments such as the Internet 644 for provision to customers via the HFC network 615 and the STB 118. According to embodiments, client application 640 may include the client 108 described herein.

According to embodiments, the application server 640 obtains customer support services data, including billing data, information on customer work order status, answers to frequently asked questions, services provider contact information, and the like from data services 126 for provision to the customer via an interactive television session. The data services 126 include a number of services operated by the services provider of the CATV system 600 which may include profile and other data associated with a given customer.

A billing system 662 may include information such as a customer's name, street address, business identification number, Social Security number, credit history, and information regarding services and products subscribed to by the customer. According to embodiments, the billing system 662 may also include billing data for services and products subscribed to by the customer for bill processing, billing presentment and payment receipt.

An authentication system 666 may include information such as secure user names, subscriber profiles, subscriber IDs, fingerprint data, and/or passwords utilized by customers for access to network services.

A customer information database 668 may include general information about customers such as place of employment, business address, business telephone number, and demographic information such as age, gender, educational level, and the like. The customer information database 668 may also include general customer information such as answers to frequently asked customer questions and contact information for various service provider offices/departments. As should be understood, this information may be stored in a variety of disparate databases operated by the cable services provider.

Referring still to FIG. 6, web services system 650 is illustrated between the application server 640 and the data services 126. According to embodiments, web services system 650 serves as a collection point for data requested from each of the disparate data services systems comprising the data services 126. According to embodiments, when the application server 640 requires customer services data from one or more of the data services 126, the application server 640 passes a data query to the web services system 650. The web services system formulates a data query to each of the available data services systems for obtaining any required data for a requesting customer as identified by a set-top box or other identification associated with the customer.

The web services system 650 serves as an abstraction layer between the various data services systems and the application server 640. That is, the application server 640 is not required to communicate with the disparate data services systems, nor is the application server 640 required to understand the data structures or data types utilized by the disparate data services systems. The web services system 650 is operative to communicate with each of the disparate data services systems for obtaining necessary customer data. The customer data obtained by the web services system is assembled and is returned to the application server 640 for ultimate processing via the middleware layer 642, as described above. As should be understood by those skilled in the art, the disparate systems 650, 662, 666, 668 may be integrated or provided in any combination of separate systems, wherein FIG. 6 shows only one example.

Figure 7:
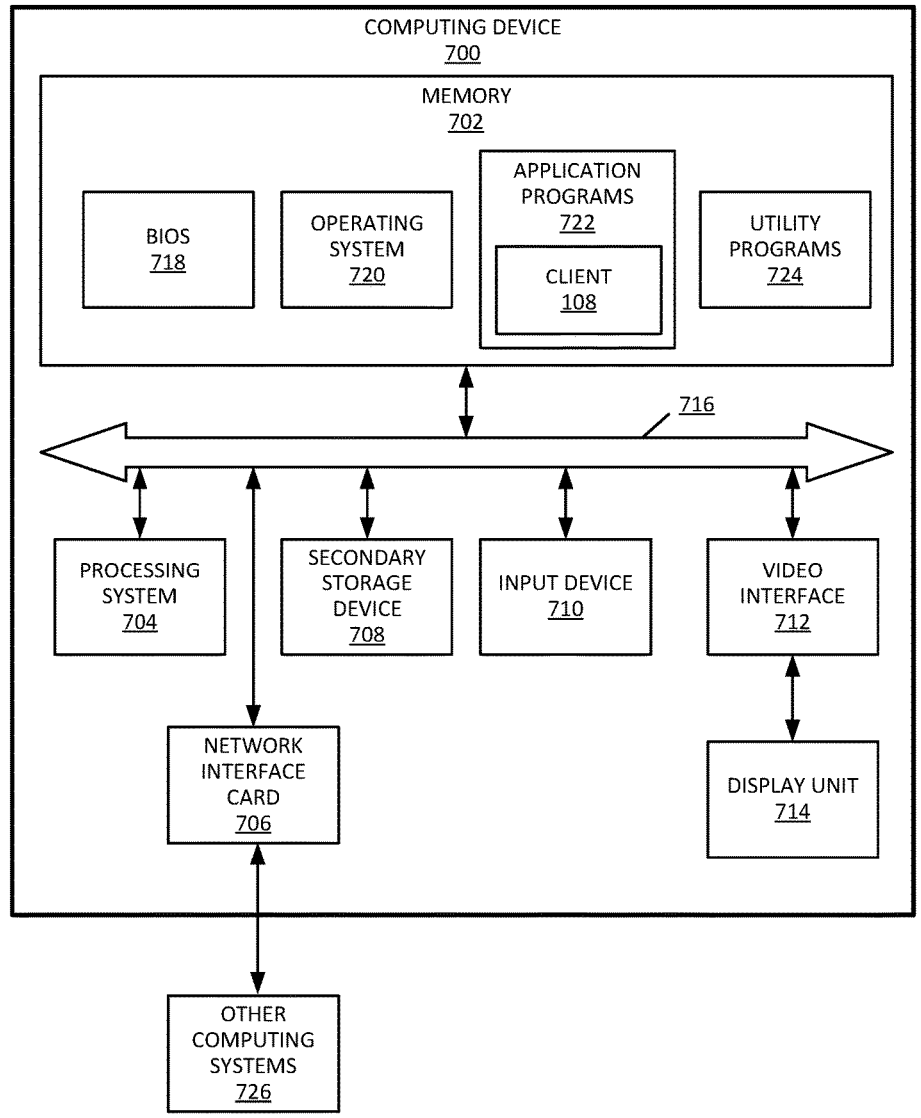
FIG. 7 is a block diagram illustrating example physical components of a computing device with which embodiments may be practiced.

FIG. 7 is a block diagram illustrating example physical components of a computing device 700 with which embodiments may be practiced. In some embodiments, one or a combination of the components 108, 110, 112, 114, 116, 118, 120, 122, 124, 126 of system 100 may be implemented using one or more computing devices like the computing device 700. It should be appreciated that in other embodiments, components 108, 110, 112, 114, 116, 118, 120, 122, 124, 126 of system 100 may be implemented using computing devices having hardware components other than those illustrated in the example of FIG. 7.

Computing devices may be implemented in different ways in different embodiments. For instance, in the example of FIG. 7, the computing device 700 includes a processing system 704, memory 702, a network interface 706, a secondary storage device 708, an input device 710, a video interface 712, a display unit 714, and a communication medium 716. In other embodiments, the computing device 700 may be implemented using more or fewer hardware components (e.g., a video interface, a display unit, or an input device) or in combination with other types of computer systems and program modules 726.

The memory 702 includes one or more computer-readable storage media capable of storing data and/or computer-executable instructions. According to one embodiment, the client 108 may be stored locally on computing device 700. Memory 702 thus may store the computer-executable instructions that, when executed by processor 704, cause the client 108 to allow users to receive personalizations associated with detected fingerprint data as described above.

In various embodiments, the memory 702 is implemented in various ways. For example, the memory 702 can be implemented as various types of computer-readable storage media. Example types of computer-readable storage media include, but are not limited to, solid state memory, flash memory, dynamic random access memory (DRAM), double data rate synchronous dynamic random access memory (DDR SDRAM), DDR2 SDRAM, DDR3 SDRAM, read-only memory (ROM), reduced latency DRAM, electrically-erasable programmable ROM (EEPROM), and other types of devices and/or articles of manufacture that store data.

The term computer-readable storage medium may also refer to devices or articles of manufacture that store data and/or computer-executable instructions readable by a computing device. The term computer-readable storage media encompasses volatile and nonvolatile, removable and non-removable media implemented in various methods or technologies for storage and retrieval of information. Such information can include data structures, program modules, computer-executable instructions, or other data.

The processing system 704 includes one or more processing units, which may include tangible integrated circuits that selectively execute computer-executable instructions. In various embodiments, the processing units in the processing system 704 are implemented in various ways. For example, the processing units in the processing system 704 can be implemented as one or more processing cores. In this example, the processing system 704 can comprise one or more microprocessors. In another example, the processing system 704 can comprise one or more separate microprocessors. In yet another example embodiment, the processing system 704 can comprise Application-Specific Integrated Circuits (ASICs) that provide specific functionality. In yet another example, the processing system 704 provides specific functionality by using an ASIC and by executing computer-executable instructions.

The computing device 700 may be enabled to send data to and receive data from a communication network via a network interface card 706. In different embodiments, the network interface card 706 is implemented in different ways, such as an Ethernet interface, a token-ring network interface, a fiber optic network interface, a wireless network interface (e.g., WIFI, WIMAX, etc.), or another type of network interface. The network interface may allow the device to communicate with other devices, such as over a wireless network in a distributed computing environment, a satellite link, a cellular link, and comparable mechanisms. Other devices may include computer device(s) that execute communication applications, storage servers, and comparable devices.

The secondary storage device 708 includes one or more computer-readable storage media, and may store data and computer-executable instructions not directly accessible by the processing system 704. That is, the processing system 704 performs an I/O operation to retrieve data and/or computer-executable instructions from the secondary storage device 708. In various embodiments, the secondary storage device 708 can be implemented as various types of computer-readable storage media, such as by one or more magnetic disks, magnetic tape drives, CD-ROM discs, DVD-ROM discs, BLU-RAY discs, solid state memory devices, and/or other types of computer-readable storage media.

The input device 710 enables the computing device 700 to receive input from a user. Example types of input devices include, but are not limited to, keyboards, mice, trackballs, stylus input devices, key pads, microphones, joysticks, touch-sensitive display screens, and other types of devices that provide user input to the computing device 700.

The video interface 712 outputs video information to the display unit 714. In different embodiments, the video interface 712 is implemented in different ways. For example, the video interface 712 is a video expansion card. In another example, the video interface 712 is integrated into a motherboard of the computing device 700. In various embodiments, the display unit 714 can be a an LCD display panel, a touch-sensitive display panel, an LED screen, a projector, a cathode-ray tube display, or another type of display unit. In various embodiments, the video interface 712 communicates with the display unit 714 in various ways. For example, the video interface 712 can communicate with the display unit 714 via a Universal Serial Bus (USB) connector, a VGA connector, a digital visual interface (DVI) connector, an S-Video connector, a High-Definition Multimedia Interface (HDMI) interface, a DisplayPort connector, or another type of connection.

The communications medium 716 facilitates communication among the hardware components of the computing device 700. In different embodiments, the communications medium 716 facilitates communication among different components of the computing device 700. For instance, in the example of FIG. 7, the communications medium 716 facilitates communication among the memory 702, the processing system 704, the network interface card 706, the secondary storage device 708, the input device 710, and the video interface 712. In different embodiments, the communications medium 716 is implemented in different ways, such as a PCI bus, a PCI Express bus, an accelerated graphics port (AGP) bus, an Infiniband interconnect, a serial Advanced Technology Attachment (ATA) interconnect, a parallel ATA interconnect, a Fiber Channel interconnect, a USB bus, a Small Computing system Interface (SCSI) interface, or another type of communications medium.

The memory 702 stores various types of data and/or software instructions. For instance, in the example of FIG. 7, the memory 702 stores a Basic Input/Output System (BIOS) 718, and an operating system 720. The BIOS 718 includes a set of software instructions that, when executed by the processing system 704, cause the computing device 700 to boot up. The operating system 720 includes a set of software instructions that, when executed by the processing system 704, cause the computing device 700 to provide an operating system that coordinates the activities and sharing of resources of the computing device 700. The memory 702 also stores one or more application programs 722 that, when executed by the processing system 704, cause the computing device 700 to provide applications to users, for example, the client 108. The memory 702 also stores one or more utility programs 724 that, when executed by the processing system 704, cause the computing device 700 to provide utilities to other software programs.

FIGS. 8A-8B illustrate a suitable mobile computing environment, for example, a mobile computing device or smart phone 110, a tablet personal computer 114, a laptop computer 112, and the like, with which embodiments may be practiced. The mobile computing device 800 is illustrative of any suitable device operative to send, receive and process wireless communications. A display screen 805 is operative for displaying a variety of information such as information about incoming and outgoing communications, as well as, a variety of data and displayable objects, for example, text, alphanumeric data, photographs, and the like.

Data input to the device 800 may be performed via a variety of suitable means, such as, touch screen input via the display screen 805, keyboard or keypad input via a data entry area 810, key input via one or more selectable buttons or controls 815, voice input via a microphone 818 disposed on the device 800, photographic input via a camera 825 functionality associated with the device 800, or any other suitable input means. Data may be output via the device 800 via any suitable output means, including but not limited to, display on the display screen 805, audible output via an associated speaker 830 or connected earphone system, vibration module for providing tactile output, and the like.

Referring now to FIG. 8B, operational unit 835 is illustrative of internal operating functionality of the mobile computing device 800. A processor 840 is illustrative of a computer processor for processing incoming and outgoing data and communications and controlling operation of the device and associated software applications via a mobile computing device operating system. Memory 845 may be utilized for storing a device operating system, device programming, one or more stored applications, for example, mobile telephone applications, data processing applications, calculators, games, Internet browsing applications, navigation applications, acceleration applications, camera and/or video applications, etc. According to one embodiment, the client 108 may be stored locally on mobile computing device 800.

Mobile computing device 800 may contain an accelerometer 855 for detecting acceleration, and can be used to sense orientation, vibration, and/or shock. Mobile computing device 800 may contain a global positioning system (GPS) system (e.g., GPS send/receive functionality) 860. A GPS system 860 uses radio waves to communicate with satellites orbiting the Earth. Some GPS-enabled mobile computing devices use wireless-assisted GPS to determine a user's location, wherein the device uses orbiting GPS satellites in conjunction with information about the device's mobile phone signal. Radio functions 850 include all required functionality, including onboard antennae, for allowing the device 800 to communicate with other communication devices and systems via a wireless network. Radio functions 850 may be utilized to communicate with a wireless or WIFI-based positioning system to determine a device location.

Although described herein in combination with mobile computing device 800, in alternative embodiments aspects may be used in combination with any number of computer systems, such as in desktop environments, laptop or notebook computer systems, multiprocessor systems, microprocessor based or programmable consumer electronics, networked PCs, mini computers, main frame computers and the like. Embodiments may be utilized in various distributed computing environments where tasks are performed by remote processing devices that are linked through a communications network in a distributed computing environment, and where programs may be located in both local and remote memory storage.

Embodiments, for example, are described above with reference to block diagrams and/or operational illustrations of methods, systems, and computer program products according to embodiments. The functions/acts noted in the blocks may occur out of the order as shown in any flowchart or described herein. For example, two processes shown or described in succession may in fact be executed substantially concurrently or the blocks may sometimes be executed in the reverse order, depending upon the functionality/acts involved.

While certain embodiments have been described, other embodiments may exist. Furthermore, although embodiments have been described as being associated with data stored in memory and other storage mediums, data may also be stored on or read from other types of computer-readable storage media. Further, the disclosed processes may be modified in any manner, including by reordering and/or inserting or deleting a step or process, without departing from the embodiments.

The foregoing description has been presented for the purposes of illustration and description. It is not intended to be exhaustive or to limit the embodiments to the precise forms disclosed. Many modifications and variations are possible in light of the above teaching. It is intended that the scope of the invention be limited not with this detailed description, but rather by the claims appended hereto.

We claim:
1. A system comprising:
a processor; and
a memory storage device including instructions that when executed by the processor are operable to:
register a first fingerprint of a user according to sensor data output from a fingerprint detection sensor that includes a first orientation of the first fingerprint comprising a master fingerprint of the user;

define first fingerprint mapping parameters to apply a first command to control and/or adjust settings and/or preferences associated with other users defined under the master fingerprint upon a subsequent detection of the first fingerprint of the user including the first orientation of the first fingerprint;

register a second orientation of the first fingerprint of the user according to sensor data output from the fingerprint detection sensor;

define second fingerprint mapping parameters to apply a second command that provides a personalized viewing guide including favorite channels for the user upon a subsequent detection of the first fingerprint of the user including the second orientation of the first fingerprint;

register a second fingerprint of the user according to sensor data output from the fingerprint detection sensor that includes a first orientation of the second fingerprint;

define third fingerprint mapping parameters to apply a third command that provides digital video recorder (DVR) recordings, DVR settings, and/or video on demand settings for the user upon a subsequent detection of the second fingerprint of the user including the first orientation of the second fingerprint;

implement a hierarchy of commands according to registered fingerprint data of the user including the first command defined by the fingerprint mapping parameters associated with the first orientation of the first fingerprint, the second command defined by the fingerprint mapping parameters associated with the second orientation of the first fingerprint, and the third command defined by the fingerprint mapping parameters associated with the first orientation of the second fingerprint;

receive fingerprint detection data associated with detection of a fingerprint;

identify fingerprint mapping parameters that correspond to the detected fingerprint; and apply the fingerprint mapping parameters associated with the fingerprint detection data.

2. The system of claim 1, further comprising an identity management (IM) component to determine a user identity based on the fingerprint detection data.

3. The system of claim 1, wherein the fingerprint detection sensor comprises one of:
an optical detection sensor,
a capacitive detection sensor, or
an ultrasound detection sensor; and
wherein the fingerprint detection sensor is integrated into one of:
a smartphone,
a tablet computer,
a laptop computer, or
a set-top box (STB) remote control device.

4. The system of claim 1, further comprising a fingerprint mapping database to map the fingerprint detection data to one or more personalizations associated with services provided by a service provider network.

5. The system of claim 4, wherein the fingerprint mapping database maps fingerprint data of each registered finger to one or more corresponding personalizations.

6. The system of claim 1, further operable to generate fingerprint mapping data based on a fingerprint scan orientation.

7. The system of claim 1, wherein the fingerprint mapping parameters map to one or more of personalized video on demand content, personalized digital video recorder (DVR) content, a personalized channel lineup, and personalized parental control settings.

8. The system of claim 1, wherein a first personalization configuration is associated with a first registered user fingerprint and a second personalization configuration is associated with a second registered user fingerprint.

9. The system of claim 1, further comprising detection circuit hardware to detect fingerprints as part of automatically logging in registered users and providing personalized services based on each registered fingerprint.

10. The system of claim 1 that operates to detect fingerprint data and provide a personalized programming guide that includes personalized television applications and settings associated with a registered fingerprint.

11. The system of claim 1, wherein one or more personalizations are mapped to one or more registered fingerprints that include one or more of personalized favorite channels, personalized guide views, personalized video on demand views, personalized searches, personalized DVR settings, personalized home security settings, and personalized parental control settings.

12. A method comprising:
registering a first fingerprint of a user according to sensor data output from a fingerprint detection sensor that includes a first orientation of the first fingerprint comprising a master fingerprint of the user;

defining first fingerprint mapping parameters to apply a first command to control and/or adjust settings and/or preferences associated with other users defined under the master fingerprint upon a subsequent detection of the first fingerprint of the user including the first fingerprint orientation;

registering a second orientation of the first fingerprint of the user according to sensor data output from the fingerprint detection sensor;

defining second fingerprint mapping parameters to apply a second command that provides a personalized viewing guide including favorite channels for the user upon a subsequent detection of the first fingerprint of the user including the second orientation of the first fingerprint;

registering a second fingerprint of the user according to sensor data output from the fingerprint detection sensor that includes a first orientation of the second fingerprint;

defining third fingerprint mapping parameters to apply a third command that provides digital video recorder (DVR) recordings, DVR settings, and/or video on demand settings for the user upon a subsequent detection of the second fingerprint of the user including the first orientation of the second fingerprint;

implementing a hierarchy of commands according to registered fingerprint data of the user including the first command defined by the fingerprint mapping parameters associated with the first orientation of the first fingerprint, the second command defined by the fingerprint mapping parameters associated with the second orientation of the first fingerprint, and the third command defined by the fingerprint mapping parameters associated with the first orientation of the second fingerprint;

receiving fingerprint detection data associated with detection of a fingerprint;

determining an identity of a user having the fingerprint based on the fingerprint detection data;

identifying fingerprint mapping parameters that correspond to the identity of the user having the fingerprint; and applying the fingerprint mapping parameters associated with the identity of the user having the fingerprint.

13. The method of claim 12, wherein the fingerprint detection sensor is one of an optical detection sensor, a capacitive detection sensor, or an ultrasound detection sensor.

14. The method of claim 12, further comprising using a remote control that includes the fingerprint detection sensor to interact with a STB and provide the fingerprint detection data.

15. The method of claim 12, further comprising generating a mapping table that maps fingerprint detection data to the one or more personalizations associated with television programming provided by a service provider network.

16. The method of claim 12, further comprising using a first personalization configuration associated with a first user fingerprint scan and a second personalization configuration associated with a second user fingerprint scan.

17. The method of claim 12, further comprising receiving one or more personalizations according to detected fingerprint data that include one or more of personalized favorite channels, personalized guide views, personalized video on demand views, personalized searches, personalized DVR settings, personalized home security settings, and personalized parental control settings.

18. A device to:
register a first fingerprint of a user with an application server according to sensor data output from a fingerprint detection sensor that includes a first orientation of the first fingerprint comprising a master fingerprint of the user;

define first fingerprint mapping parameters to apply a first command to control and/or adjust settings and/or preferences associated with other users defined under the master fingerprint upon a subsequent detection of the first fingerprint of the user including the first fingerprint orientation;

register a second orientation of the first fingerprint of the user with the application server according to sensor data output from the fingerprint detection sensor;

define second fingerprint mapping parameters to apply a second command that provides a personalized viewing guide including favorite channels for the user upon a subsequent detection of the first fingerprint of the user including the second orientation of the first fingerprint;

register a second fingerprint of the user according to sensor data output from the fingerprint detection sensor that includes a first orientation of the second fingerprint;

define third fingerprint mapping parameters to apply a third command that provides digital video recorder (DVR) recordings, DVR settings, and/or video on demand settings for the user upon a subsequent detection of the second fingerprint of the user including the first orientation of the second fingerprint;

implement a hierarchy of commands according to registered fingerprint data of the user including the first command defined by the fingerprint mapping parameters associated with the first orientation of the first fingerprint, the second command defined by the fingerprint mapping parameters associated with the second orientation of the first fingerprint, and the third command defined by the fingerprint mapping parameters associated with the first orientation of the second fingerprint;

use the fingerprint detection sensor to generate fingerprint detection output associated with detection of a fingerprint;

send the fingerprint detection output to the application server to identify fingerprint mapping parameters that correspond to the detected fingerprint; and receive the identified fingerprint mapping parameters from the application server.

19. The device of claim 18, wherein the fingerprint detection sensor is one of an optical detection sensor, a capacitive detection sensor, or an ultrasound detection sensor.

20. The device of claim 18 comprising a smartphone, a tablet computer, a laptop computer, or a STB.

* * * * *